United States Patent [19]

Izard

[11] Patent Number: 4,703,463
[45] Date of Patent: Oct. 27, 1987

[54] SEISMIC VIBRATION APPARATUS

[76] Inventor: Bernell Izard, 8240 E. Lightningview, Parker, Colo. 80134

[21] Appl. No.: 849,908

[22] Filed: Apr. 9, 1986

[51] Int. Cl.⁴ ............................................. G01V 1/047
[52] U.S. Cl. .................... 367/147; 367/150; 367/188; 181/113; 181/114; 181/401
[58] Field of Search ............... 181/106, 113, 114, 117, 181/400, 401; 367/147, 188, 177, 176, 173, 169, 165, 162, 150, 145

[56] References Cited

U.S. PATENT DOCUMENTS

| | | | |
|---|---|---|---|
| 3,244,253 | 4/1966 | Blizard | 181/400 X |
| 3,356,178 | 12/1967 | Nash | 181/113 |
| 3,403,375 | 9/1968 | Wright et al. | 367/147 |
| 3,428,940 | 2/1969 | Huckabay | 367/147 |
| 3,728,671 | 4/1973 | Poston | 367/147 |
| 4,148,375 | 4/1979 | Dowler et al. | 181/117 |

Primary Examiner—Charles T. Jordan
Assistant Examiner—John W. Eldred
Attorney, Agent, or Firm—Vinson & Elkins

[57] ABSTRACT

An apparatus for introducing vibrations into the ground including a container having electrodes mounted therein with electrical connections leading from a source of electric potential to said electrodes, salt water substantially filling the container, and means for placing the container on the ground in position to transmit vibrations to the ground.

2 Claims, 7 Drawing Figures

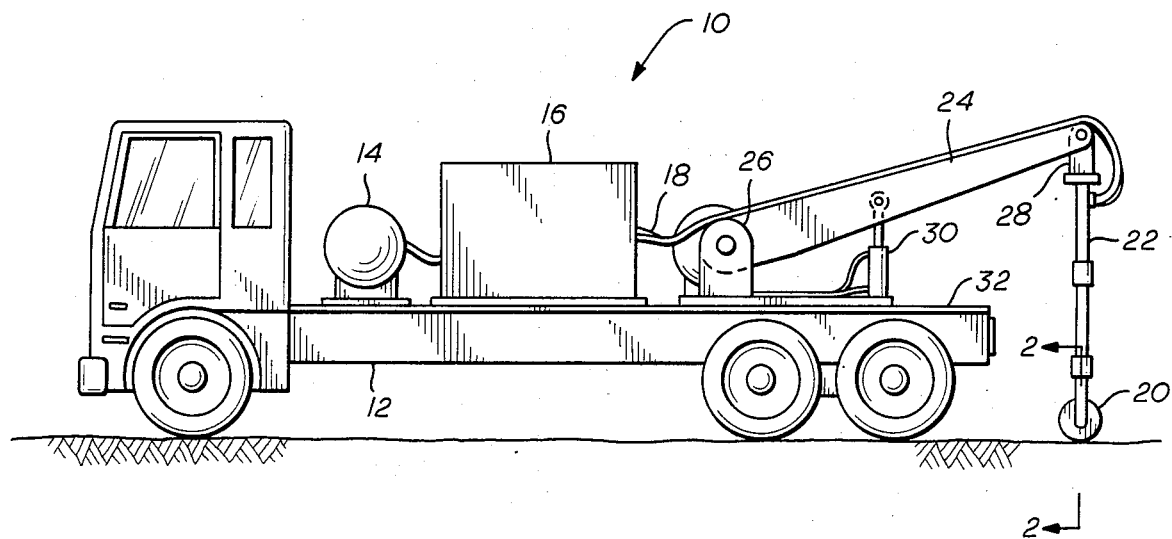
FIG. 1
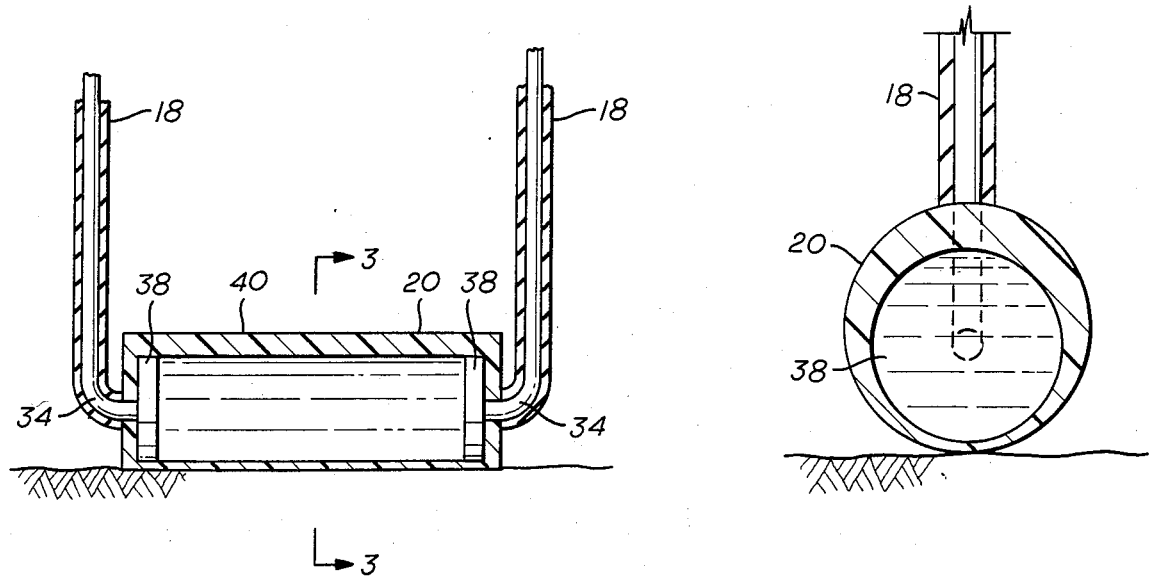
FIG. 2
FIG. 3

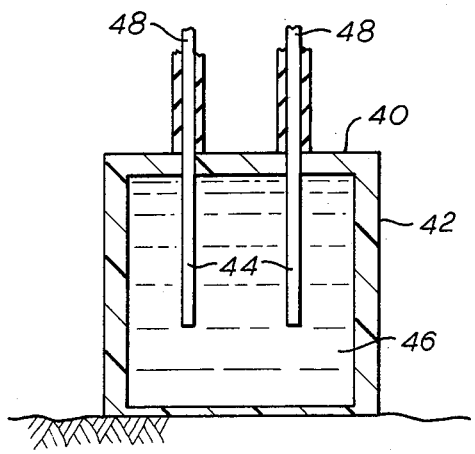
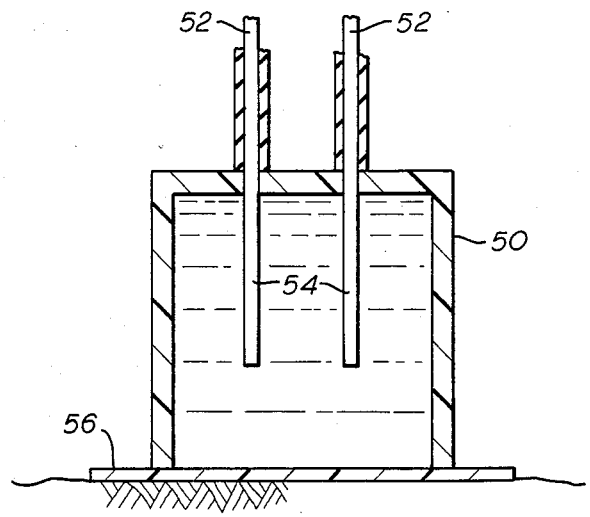
FIG. 4    FIG. 5
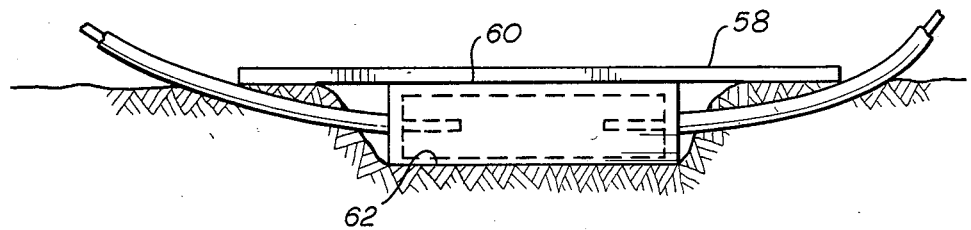
FIG. 6
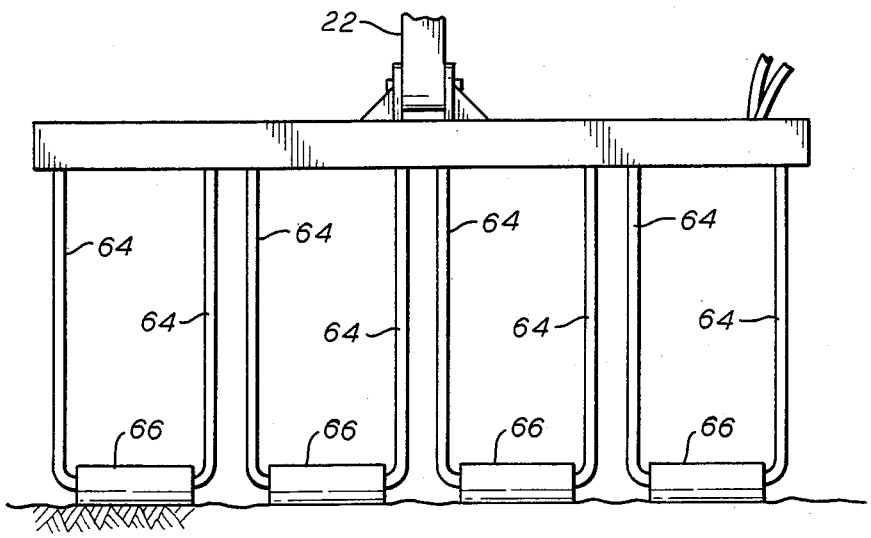
FIG. 7

SEISMIC VIBRATION APPARATUS

BACKGROUND

In seismic exploration, particularly for hydrocarbons, it is common practice to impart vibrations to the earth and to provide a plurality of sensing devices (commonly called geophones) to detect reflected vibrations. The recordings of these reflected vibrations provides geologists with information used for predicting the geological formations below the surface and with proper formations, the presence of oil or gas.

Generally, the imparting of such vibrations to the earth has been accomplished by the ignition of dynamite or other explosives. Also, thumpers have been used involving the imparting of a substantial force on a plate on the ground or dropping a plate onto the ground. In exploration for oil and gas formations which occur under water it has been common to create vibrations by sparkers which utilize the discharge of an electrical charge between two underwater electrodes. By being underwater the coupling to the earth has not been a problem but attempts to utilize sparkers on land have met with no success since they have not imparted sufficient energy into the ground to provide useful returned reflection recordings.

Difficulties are also encountered with explosives since they take from two to ten milliseconds to complete their burn. Such long burn time creates point source noise and earth movement in the form of a shear wave which interferes with the initial reflections received by the geophones. In some situations the use of an explosive as the source of vibration imparted to the earth renders recordings of the first fifty milliseconds impractical.

SUMMARY

The present invention provides an improved apparatus for imparting seismic vibrations to the earth. It includes a portable vehicle with an electrical generator, a sparker, a sparker apparatus such as a sparker tube, means for lowering the sparker tube into contact with the ground, and insulated wires for connecting the sparker to the sparker tube on the ground. The sparker tube preferably includes a plastic tube filled with salt water and having an electrode on each end of the tube. The thickness of the tube, its length and varying thickness of the tube contribute to controlling basic frequencies and to directional control in the release of the vibration. Other sparker tube structures are provided including a covering plate to ensure the transmission of the vibrations generated by the sparker tube into the ground.

An object of the present invention is to provide an improved apparatus for imparting seismic vibrations into the ground which provides good resolution in the recorded reflections.

Another object is to provide improved seismic vibration apparatus which generates higher frequencies in the range from 60 to 125 Hertz which are higher than vibrations generated by explosives and transmits such frequencies into the ground to provide an improved record of the subsurface formations.

Still another object is to provide an improved seismic vibration apparatus which is free from point source noise.

A further object is to provide an improved seismic vibration apparatus in which shear wave generation is not sufficient to block the reading of weak reflected signals.

BRIEF DESCRIPTION OF THE DRAWINGS

These and other objects and advantages are hereinafter set forth and explained with respect to the drawings wherein:

FIG. 1 is an elevation view of a vehicle for moving the improved seismic vibration apparatus of the present invention into a position at which vibrations are to be imparted into the ground.

FIG. 2 is a detailed sectional view of the improved form of sparker tube of the present invention.

FIG. 3 is a view taken along line 3—3.

FIG. 4 is a view of another form of sparker tube of the present invention.

FIG. 5 is a sectional view of still another form of sparker tube.

FIG. 6 is a sectional view of another form of apparatus of the present invention.

FIG. 7 is a schematic diagram of the connection of a plurality of sparkers for simultaneous or sequential use.

DESCRIPTION OF THE PREFERRED EMBODIMENTS

The improved apparatus 10 of the present invention is shown in FIG. 1 mounted on truck 12 and includes electric generator 14 which may be driven by suitable means (not shown) such as the engine of truck 12 or a separate engine mounted in driving connection with generator 14, sparker 16 which receives the current generated by generator 14 and stores it as potential which may be conducted as a substantial surge of electrical power through lines 18 to sparker tube 20. Sparker tube 20 is supported at the outer end of arm 22 which is pivotally connected to arm 24 which is pivoted to stand 26. Arms 22 and 24 are controlled by hydraulic control means 28 which is illustrated in FIG. 1 as hydraulic ram 30 connected from the bed 32 of truck 12 to arm 22. Lines 18 extend from sparker 16 along arms 22 and 24 to sparker tube 20. Arms 22 and 24 are of sufficient length to place sparker tube 20 firmly against the ground at a preselected position with respect to the receiving devices.

Sparker tube 20 is shown in detail in FIG. 2. Lines 18 connect to leads 34 which are of substantial size such as, for example, $\frac{3}{4}''$ copper rods which connect to the electrodes 36 that are $\frac{3}{4}''$ copper plate electrodes 38 positioned within opposite ends of tube 40. Tube 40 is preferably a brittle plastic tube having a length, diameter and thickness which are preselected to provide the desired frequency and energy release in the vibrations emitted therefrom to the ground. The direction of the emitted vibrations can be controlled by constructing tube 40 to have a relatively thick portion and a thin portion. With such a tube 40 (shown in FIG. 3) the thin portion of tube 40 is placed against the ground so that the emitted vibrations are directed downwardly. The interior of tube 40 contains the salt water which is used in the generation of the emitted vibrations.

A modified form of the sparker tube is shown in FIG. 4 and is substantially the same as sparker tube 40 but rather than having its tube of plastic it is made of a soft container 42 made of cardboard or other suitable material with the appropriate electrodes 44 positioned in the ends with salt water 46 between electrodes 44 and insulated leads 48 leading from electrodes 44 to the lines 18.

In the form of the invention shown in FIG. 5 a suitable container 50 of steel or synthetic is provided with leads 52 connecting to electrodes 54 within the upper interior of container 50. Flange 56 surrounds the lower exterior of container 50 and is designed to rest on the ground prior to actuation of the apparatus. It is contemplated that the lower portion of container 50 may be open, or closed with a material which allows the transmission of the force of the actuation of the apparatus to the ground.

The apparatus of FIG. 6 discloses the use of Plate 58 with sparker tube 60. As shown, sparker tube 60 is placed in contact with ground 62 and plate 58 of suitable material, such as steel or synthetic material. plate 58 is used to ensure that a major portion of the force resulting from the actuation of sparker tube 60 is directed into the ground 62.

FIG. 8 illustrates connections of lines 64 leading to the electrodes (not shown) of a plurality of sparker tubes 66 when it is desired to have a plurality of sparker tubes actuated either simultaneously or on a predetermined sequence.

What is claimed is:

1. An apparatus for introducing vibrations into the ground comprising
   a brittle container,
   a pair of electrodes positioned within said container in spaced relationship to each other,
   means providing electric power,
   electrical transmission lines connecting said electric power means with said said electrodes,
   means for creating an electric potential between said electrodes sufficient to generate a spark discharge,
   means for placing said container on the ground,
   salt water within said container whereby the discharge of the electrical potential across said electrodes develops an explosive force to introduce vibrations into the ground,
   said container is a tube and said electrodes are positioned in the ends of the tube with the salt water between the electrodes substantially filling the tube,
   said tube has an eccentricity between its inner surface and its exterior surface so that one portion thereof is thinner than the remainder of the tube whereby the acoustic pulse generated can be directionally controlled by coupling the thinner side with the ground.

2. An apparatus for introducing vibrations into the ground comprising
   a brittle container,
   a pair of electrodes positioned within said container in spaced relationship to each other,
   means providing electric power,
   electrical transmission lines connecting said electric power means with said said electrodes,
   means for creating an electric potential between said electrodes sufficient to generate a spark discharge,
   means for placing said container on the ground,
   salt water within said container whereby the discharge of the electrical potential across said electrodes develops an explosive force to introduce vibrations into the ground,
   said container has a varying thickness between its inner surface and its exterior surface so that one portion of said container is thinner than the remainder of the container such that the acoustic pulse generated can be directionally controlled by coupling the thinner side with the ground.

* * * * *